United States Patent [19]

Morency et al.

[11] 4,432,603
[45] Feb. 21, 1984

[54] MULTICHANNEL FIBER OPTICS CONNECTOR

[75] Inventors: Roger L. Morency, Voluntown; Lester D. Olin, Mystic, both of Conn.

[73] Assignee: The United States of America as represented by the Secretary of the Navy, Washington, D.C.

[21] Appl. No.: 296,285

[22] Filed: Aug. 26, 1981

[51] Int. Cl.³ .............................................. G02B 7/26
[52] U.S. Cl. .................... 350/96.21; 350/96.20
[58] Field of Search ............... 350/96.20, 96.21, 96.22

[56] References Cited

U.S. PATENT DOCUMENTS

| 2,567,036 | 8/1948 | Shannon | 350/96.20 X |
|---|---|---|---|
| 3,825,320 | 7/1974 | Redfern | 350/96.22 |
| 3,951,515 | 4/1976 | Allard | 350/96.22 |
| 3,982,815 | 9/1976 | Nakayama | 350/96.22 |
| 4,076,379 | 2/1978 | Chouinard | 350/96.22 |
| 4,082,421 | 4/1978 | Auracher et al. | 350/96.22 |
| 4,119,363 | 10/1978 | Camlibel et al. | 350/96.20 |
| 4,124,364 | 11/1978 | Dalgoutte | 65/4 |
| 4,174,882 | 11/1979 | McCartney | 350/96.21 |
| 4,198,119 | 4/1980 | Uberbacher | 350/96.20 |
| 4,279,466 | 7/1981 | Makuch et al. | 350/96.21 |

FOREIGN PATENT DOCUMENTS

| 2516662 | 7/1976 | Fed. Rep. of Germany | 350/96.21 |
|---|---|---|---|
| 53-75948 | 7/1978 | Japan | 350/96.22 |
| 55-62417 | 5/1980 | Japan | 350/96.21 |

*Primary Examiner*—John D. Lee
*Attorney, Agent, or Firm*—Robert F. Beers; Arthur A. McGill; Prithvi C. Lall

[57] ABSTRACT

A multichannel fiber optics connector comprises two virtually identical halves, each of which is made up of an insert alignment bushing, a shell and a clamping nut. The bushing has anchor and keying pins attached. The connector is waterproof and pressure tolerant for underwater use.

8 Claims, 5 Drawing Figures

MULTICHANNEL FIBER OPTICS CONNECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention generally relates to fiber optics and more particularly to underwater connectors suitable for handling fiber optic conductor wires.

(2) Description of the Prior Art

Over the past few years, the fiber optics technology has developed quite rapidly. As a result the fiber optic conductor wires development has outpaced the associated connector development. In addition, the major development emphasis within the fiber optic industry has focused on land-based telecommunications. Allard in U.S. Pat. No. 3,951,515 describes a fiber optic hull penetrating assembly having watertight integrity and Redfern teaches a bulkhead penetrator suitable for underwater use that carries a single fiber optic lead. There are no known waterproof, pressure tolerant, multichannel mating connectors suitable for being placed on the ocean floor or in a completely surrounding underwater environment.

SUMMARY OF THE INVENTION

The present assembly, suitable for underwater use, comprises two virtually identical connector halves, each of which is made up of an insert alignment bushing, a shell, a clamping nut and associated components. A compliant optical index matching film provides a seal on the mating components. Epoxy is inserted in the back end of the shells for sealing, strain relief and alignment purposes.

DESCRIPTION OF THE PREFERRED EMBODIMENT

Figure 1:
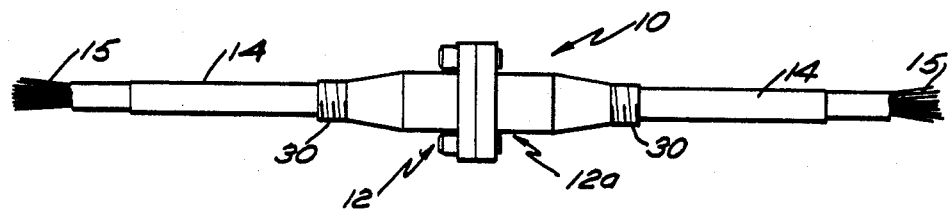
FIG. 1 shows a mated connector in accordance with the present invention.

Referring now to FIG. 1 there is generally shown a mated connector assembly 10 with two virtually identical connectors 12 and 12a. The connectors 12 and 12a each have a fiber optic cable 14, containing fibers 15, inserted in them.

Figure 2:
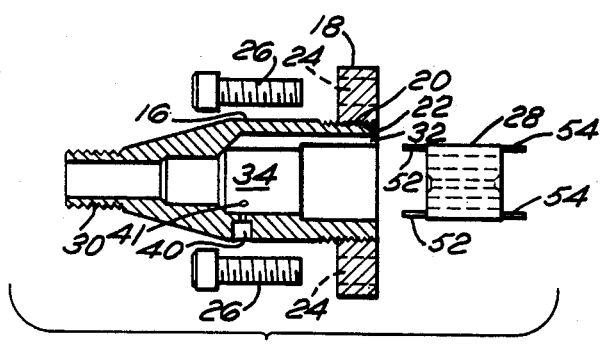
FIG. 2 shows an exploded side view of a connector of FIG. 1 with the shell and clamping not shown in a cross-sectional view.
Figure 3:
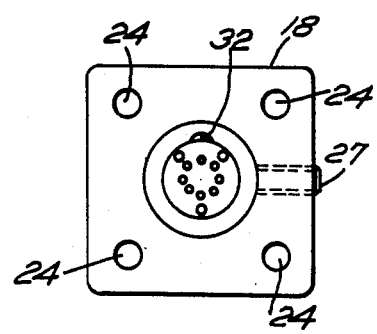
FIG. 3 is a front view of the connector of FIG. 2.
Figure 4:
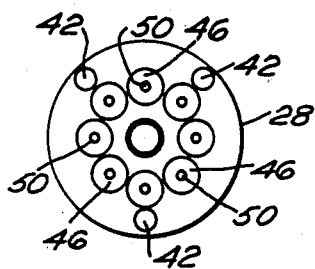
FIG. 4 shows an enlarged view of the insert alignment bushing of FIG. 3.
Figure 5:
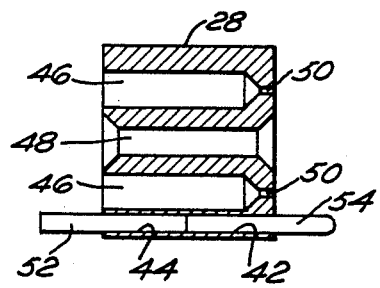
FIG. 5 is a side cross-sectional view of the insert alignment bushing of FIG. 4.

FIG. 2 shows an exploded view of connector 12 with a shell 16 and a clamping nut 18 in section. The clamping nut 18 has threads 20 on its inner surface for threading to the outer surface threads 22 of shell 16. Apertures 24 are bored through clamping nut 18 for insertion of cap screw 26. The clamping nut 18 is fixed to shell 16 by means of set screw 27 shown in FIG. 3. The mating clamping nut of connector 12a differs in that its apertures are threaded to permit compression of cap screw 26.

The shell 16 is designed to provide strain relief of cable 14, a means of securing an insert 28 and a means of providing an adjustable clamping method of the two halves 12 and 12a. The tail end of the shell has serrations 30 to permit the addition of heat shrink tubing to increase strain relief. The internal configuration contains a keyway 32 that provides torsional strength to a cavity 34 that is epoxy filled and unmobilizes all movement of insert 28 and fibers 15 of cable 14. The outside diameter of the shell 16 has the fine thread 22 to allow for minute adjustment of the connectors 12 and 12a interface to permit gap control between the fiber 15 ends. Adjustment is maintained by locking of set screw 27. Counterbored fill hole 40 and exit hole 41 on the side of the shell 16 provide a means of filling the cavity 34 with potting material.

The insert alignment bushing 28 shown in FIGS. 2-5, inclusive, is a solid slug of material, such as brass or epoxy, to which keying pin holes 42, anchor pin holes 44, fiber optic lead holes 46 and a strength member hole 48 have been added. The strength member hole 48 is optional being dependent on cable design requirements. The fiber optic lead holes 46 hold both the stripped fiber and jacketed fiber 15. They are counterbored holes with each containing a stripped fiber guide hole 50 at the bushing 28 interface. The stripped fiber guide hole 50 is made slightly oversize to permit ease of assembly and to allow a self-centering of fiber by hydraulic action of the bonding material. Permanent anchor pins 52 are inserted in the anchor pin holes 44 at the after end of the bushing 28. These pins 52 provide anchor points and add torsional strength when the bushing 28 is potted in place. Keying pins 54 are inserted in the holes 42 of bushing 28 in either connector 12 or 12a of FIG. 1. The connector faces 12 and 12a are polished prior to insertion of the keying pins 54.

There has therefore been described a low weight connector assembly 10 that can be salvaged and re-used. The connector assembly 10 shown has eight channels and is approximately the same size as currently available single channel connectors. The fiber 15 density of this assembly 10 can be easily varied by changing the configuration of the inserts 28. The device can be used as an inline cable to cable, cable to loose strands or loose strands to loose strands. It can be printed circuit board mounted to accommodate numerous transmission lines. The concept lends itself to various fiber sizes. Although designed for a one hundred forty micron fiber 15, the insert 28 can be changed to accept larger or smaller fibers. The process by which the bonding agent is applied allows for an automatic self-centering of each fiber in its respective hole.

It will be understood that many additional changes in the details, materials, steps and arrangement of parts, which have been herein described and illustrated in order to explain the nature of the invention, may be made by those skilled in the art within the principal and scope of the invention as expressed in the appended claims.

What is claimed is:

1. A fiber optic connector comprising:
   a housing shell having an axially aligned aperture running from the aft end to the forward end of said shell, such aft end adapted to receive fiber optic leads, said shell having fill and exit apertures for potting;

a clamping nut forming a collar around the forward end of said shell, said clamping nut adapted to be affixed to a mating connector;

an insert alignment bushing being inserted in the forward end of said shell, said bushing comprising a solid slug of material having keying pin apertures, anchor pin apertures and fiber optic lead apertures, respective members of said keying pin apertures and said anchor pin apertures having the same axis;

anchor pins inserted in said anchor pin apertures; and keying pins inserted in said keying pin apertures.

2. A fiber optic connector according to claim 1 further comprising a set screw affixing said clamping nut to said forward end of said shell.

3. A fiber optic connector according to claim 2 wherein said insert alignment bushing further comprises a strength member aperture.

4. A fiber optic connector according to claim 3 wherein said respective members of said keying pin apertures and said respective members of said anchor pin apertures are extensions of each other.

5. A fiber optic connector assembly comprising:

a first and second connector with each of said first and second connectors having a housing shell, a clamping nut, an insert alignment bushing and anchor pins;

each housing shell having an axially aligned aperture running from the aft end to the forward end of said shell, said shell having fill and exit apertures for potting;

each clamping nut forming a collar around the forward end of its associated shell, each nut having aligned apertures for connecting purposes, the apertures of one nut are clearance apertures and of the other nut are threaded apertures;

each insert alignment bushing being inserted in the forward end of its associated shell, each bushing comprising a solid slug of material having keying pin apertures, anchor pin apertures and fiber optic lead apertures, respective members of said keying pin apertures and said anchor pin apertures having the same axis;

anchor pins inserted in said anchor pin apertures of each insert alignment bushing;

fiber optic leads inserted in each housing shell at the aft end of said axially aligned aperture and connected within said respective fiber optic lead apertures of its associated insert alignment bushing;

potting material surrounding said fiber optic leads within each of said housing shells;

keying pins inserted in respective aligned keying pin apertures; and cap screws connecting each clamping nut to each other.

6. A fiber optic connector assembly according to claim 5 further comprising two set screws, one for affixing each said clamping nut to a respective forward end of said shell.

7. A fiber optic connector assembly according to claim 6 wherein each insert alignment bushing also comprises a strength member aperture.

8. A fiber optic connector assembly according to claim 7 wherein said respective members of said keying pin apertures and said respective members of said anchor pin apertures are extensions of each other.

* * * * *